United States Patent
Zhu et al.

(10) Patent No.: US 11,516,709 B2
(45) Date of Patent: Nov. 29, 2022

(54) VOICE FALLBACK IN 5G NR

(71) Applicant: QUALCOMM Incorporated, San Diego, CA (US)

(72) Inventors: Xipeng Zhu, San Diego, CA (US); Masato Kitazoe, Hachiouji (JP); Gavin Bernard Horn, La Jolla, CA (US); Shyamal Ramachandran, San Diego, CA (US); Arvind Vardarajan Santhanam, San Diego, CA (US); Tom Chin, San Diego, CA (US); Min Wang, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,672

(22) Filed: Aug. 12, 2020

(65) Prior Publication Data

US 2020/0374761 A1    Nov. 26, 2020

Related U.S. Application Data

(63) Continuation of application No. 16/737,639, filed on Jan. 8, 2020.
(Continued)

(51) Int. Cl.
*H04W 4/00* (2018.01)
*H04W 36/00* (2009.01)
(Continued)

(52) U.S. Cl.
CPC ....... *H04W 36/0022* (2013.01); *H04W 36/08* (2013.01); *H04W 36/12* (2013.01)

(58) Field of Classification Search
CPC . H04W 36/08; H04W 36/12; H04W 36/0022; H04W 36/0079; H04W 36/14
(Continued)

(56) References Cited

U.S. PATENT DOCUMENTS

| 7,263,108 B2 | 8/2007 | Kizhepat | |
| 2011/0176485 A1* | 7/2011 | Pudney | H04W 36/0022 370/328 |

(Continued)

FOREIGN PATENT DOCUMENTS

WO    2018026139 A1    2/2018

OTHER PUBLICATIONS

"3rd Generation Partnership Project; Technical Specification Group Radio Access Network; NR; Radio Resource Control ( RRC) protocol specification (Release 15)", 3GPP Standard, Technical Specification, 3GPP TS 38.331, 3rd Generation Partnership Project (3GPP), Mobile Competence Centre, 650, Route Des Lucioles, F-06921 Sophia-Antipolis Cedex, France, vol. RAN WG2. No. V15.4.0, Jan. 14, 2019 (Jan. 14, 2019), pp. 1-471, XP051591713, [retrieved on Jan. 14, 2019], Section 5.3.3.
(Continued)

*Primary Examiner* — Thai D Hoang
(74) *Attorney, Agent, or Firm* — Harrity & Harrity, LLP \ Qualcomm

(57) ABSTRACT

This disclosure provides systems, methods, apparatuses and computer-readable medium for wireless communication. In some aspects, a user equipment (UE) may receive, from a first base station (BS) associated with a fifth generation New Radio (5G NR) radio access technology (RAT), a command of mobility from the 5G NR RAT to a second RAT. The UE may determine that the command of mobility is for voice fallback. The UE may transmit, to a second BS associated with the second RAT and based at least in part on deter-
(Continued)

mining that the command of mobility is for voice fallback, a radio resource control (RRC) connection request communication for attempting to communicatively connect with the second BS for voice fallback.

30 Claims, 5 Drawing Sheets

Related U.S. Application Data

(60) Provisional application No. 62/797,663, filed on Jan. 28, 2019.

(51) Int. Cl.
*H04W 36/12* (2009.01)
*H04W 36/08* (2009.01)

(58) Field of Classification Search
USPC .................................. 370/329–330, 335–345
See application file for complete search history.

(56) References Cited

U.S. PATENT DOCUMENTS

| | | | |
|---|---|---|---|
| 2012/0015650 A1* | 1/2012 | Pudney | H04W 36/0022 455/434 |
| 2013/0065600 A1 | 3/2013 | Lim | |
| 2013/0070718 A1 | 3/2013 | Lim et al. | |
| 2013/0287002 A1* | 10/2013 | Kim | H04W 76/38 370/331 |
| 2015/0011214 A1* | 1/2015 | Qu | H04W 36/0022 455/436 |
| 2015/0049707 A1 | 2/2015 | Vajapeyam et al. | |
| 2015/0117360 A1 | 4/2015 | Shen et al. | |
| 2015/0245271 A1 | 8/2015 | Balasubramanian et al. | |
| 2015/0264738 A1 | 9/2015 | Lee et al. | |
| 2016/0205578 A1 | 7/2016 | Lee et al. | |
| 2017/0118737 A1 | 4/2017 | Batchu et al. | |
| 2018/0192412 A1 | 7/2018 | Novlan et al. | |
| 2019/0037417 A1* | 1/2019 | Lei | H04L 41/082 |
| 2019/0045404 A1* | 2/2019 | Tsai | H04W 36/0022 |
| 2019/0053028 A1* | 2/2019 | Chandramouli | H04W 4/90 |
| 2019/0149583 A1* | 5/2019 | Jutila | H04L 65/1016 455/435.1 |
| 2019/0166576 A1* | 5/2019 | Kim | H04W 36/08 |
| 2019/0174003 A1* | 6/2019 | Chandramouli | H01F 7/0278 |
| 2019/0281506 A1 | 9/2019 | Chiang et al. | |
| 2019/0281647 A1 | 9/2019 | Chiang et al. | |
| 2020/0059285 A1 | 2/2020 | Zhang et al. | |
| 2020/0112887 A1* | 4/2020 | Kwok | H04W 36/0022 |
| 2020/0137710 A1 | 4/2020 | Surisetty et al. | |
| 2020/0196199 A1 | 6/2020 | Sharma et al. | |
| 2020/0245195 A1* | 7/2020 | Zhu | H04W 36/0022 |
| 2020/0383010 A1* | 12/2020 | Zhu | H04W 76/27 |
| 2020/0396667 A1* | 12/2020 | Kaasalainen | H04W 76/10 |
| 2021/0136636 A1 | 5/2021 | Zhu et al. | |

OTHER PUBLICATIONS

Ericsson: "RRC Procedures for Inter-RAT Mobility from NR to E-UTRA", 3GPP Draft, 3GPP TSG-RAN WG2 #101, R2-1802643 RRC Procedures for Inter-RAT Mobility from NR to E-UTRA, 3rd Generation Partnership Project (3GPP), Mobile Competence Centre, 650, Route Des Lucioles, F-06921 Sophia-Antipolis, vol. RAN WG2, No. Athens, Greece, Feb. 26, 2018-Mar. 2, 2018, Feb. 15, 2018 (Feb. 15, 2018), XP051399546, pp. 1-4, Retrieved from the Internet: URL: http://www.3gpp.org/ftp/tsg%5Fran/WG2%5FRL2/ TSGR2%5F101/Docs/, [retrieved on Feb. 15, 2018], Section 2.1.
International Search Report and Written Opinion—PCT/US2020/ 012840—ISA/EPO—dated Apr. 8, 2020.
Oppo, et al., "Returning Back to NR in Case of Handover for Voice", 3GPP Draft, SA WG2 Meeting #122bis, S2-176977, Returning Back To Nrin Case Of Handover For Voice P-CR, 3rd Generation Partnership Project (3GPP), Mobile Competence Centre, 650, Route Des Lucioles, F-06921 Sophia-Antipolis, vol. SA WG2, No. Ljubljana, Slovenia, Oct. 23, 2017-Oct. 27, 2017, Oct. 17, 2017 (Oct. 17, 2017), XP051359673, pp. 1-6, Retrieved from the Internet: URL: http://www.3gpp.org/ftp/Meetings_3GPP_SYNC/SA2/ Docs/, [retrieved on Oct. 17, 2017], the whole document.

* cited by examiner

VOICE FALLBACK IN 5G NR

CROSS-REFERENCE TO RELATED APPLICATIONS

This application is a continuation of U.S. patent application Ser. No. 16/737,639, filed on Jan. 8, 2020, entitled "VOICE FALLBACK IN 5G NR," which claims priority to U.S. Provisional Application No. 62/797,663, filed on Jan. 28, 2019, entitled "VOICE FALLBACK IN 5G NR," which are hereby expressly incorporated by reference herein.

TECHNICAL FIELD

Aspects of the present disclosure generally relate to wireless communication, and more particularly to techniques and apparatuses for voice fallback in fifth generation (5G) New Radio (NR).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (such as bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or further examples, or combinations thereof.

The above multiple access technologies have been adopted in various telecommunication standards to provide a common protocol that enables different user equipment to communicate on a municipal, national, regional, and even global level. New Radio (NR), which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving, from a first base station (BS) associated with a fifth generation New Radio (5G NR) radio access technology (RAT), a command of mobility from the 5G NR RAT to a second RAT. The method may include determining that the command of mobility is for voice fallback. The method may include transmitting, to a second BS associated with the second RAT and based at least in part on determining that the command of mobility is for voice fallback, a radio resource control (RRC) connection request communication for attempting to communicatively connect with the second BS for voice fallback.

In some aspects, the second RAT includes a Long Term Evolution (LTE) RAT or a third generation (3G) RAT. In some aspects, determining that the command of mobility is for voice fallback includes determining that the command of mobility is for voice fallback based at least in part on identifying a voice fallback indication included in the command of mobility. In some aspects, the command of mobility is included in a MobilityFromNRCommand NR RRC communication, a HandoverPreparationInformation LTE RRC communication, an RRCRelease NR RRC communication, a source radio network controller (RNC) to target RNC transparent container, or a universal mobile telecommunications system terrestrial radio access network RRC connection request communication.

In some aspects, determining that the command of mobility is for voice fallback includes determining that the command of mobility is for voice fallback based at least in part on at least one of receiving the command of mobility while establishing the voice call or a capability of the UE to implement a voice over NR (VoNR) voice call. In some aspects, the RRC connection request communication indicates a voice call as a cause value.

In some aspects, the method includes detecting a failure in the attempt to communicatively connect with the second BS and attempting to communicatively connect with a third BS associated with the second RAT based at least in part on detecting failure in the attempt to communicatively connect with the second BS and based at least in part on receiving the command of mobility. In some aspects, the first BS and the second BS are a same BS, the 5G NR RAT is associated with a first cell of the same BS, and where the second RAT is associated with a second cell of the same BS. In some aspects, the first BS and the second BS are different BSs, the 5G NR RAT is associated with a cell of the first BS, and the second RAT is associated with a cell of the second BS.

In some aspects, the first BS, the second BS, and the third BS are a same BS, the 5G NR RAT is associated with a first cell of the same BS, the second RAT is associated with a second cell of the same BS, and the second RAT is associated with a third cell of the same BS. In some aspects, the first BS, the second BS, and the third BS are different BSs, the 5G NR RAT is associated with a cell of the first BS, the second RAT is associated with a cell of the second BS, and the second RAT is associated with a cell of the third BS.

In some aspects, the second BS and the third BS are different BSs, the second RAT is associated with a cell of the second BS, and the second RAT is associated with a cell of the third BS. In some aspects, the second BS and the third BS are a same BS, the second RAT is associated with a first cell of the same BS, the second RAT is associated with a second cell of the same BS. In some aspects, the first BS and the third BS are a same BS, the 5G NR RAT is associated with a first cell of the same BS, and the second RAT is associated with a second cell of the same BS.

Another innovative aspect of the subject matter described in this disclosure can be implemented in a UE for wireless communication. The UE may include memory and one or more processors operatively coupled to the memory. The memory and the one or more processors may be configured to receive, from a first BS associated with a 5G NR RAT, a command of mobility from the 5G NR RAT to a second RAT. The memory and the one or more processors may be configured to determine that the command of mobility is for voice fallback. The memory and the one or more processors may be configured to transmit, to a second BS associated with the second RAT and based at least in part on determining that the command of mobility is for voice fallback, an RRC connection request communication for attempting to communicatively connect with the second BS for voice fallback. In some aspects, the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a first BS associated with a 5G NR RAT, a command of mobility from the 5G NR RAT to a second RAT. The one or more instructions, when executed by one or more processors of a UE, may cause the one or more processors to determine that the command of mobility is for voice fallback. The one or more instructions, when executed by one or more processors of a UE, may cause the one or more processors to transmit, to a second BS associated with the second RAT and based at least in part on determining that the command of mobility is for voice fallback, an RRC connection request communication for attempting to communicatively connect with the second BS for voice fallback. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for receiving, from a first BS associated with a 5G NR RAT, a command of mobility from the 5G NR RAT to a second RAT. The apparatus may include means for determining that the command of mobility is for voice fallback. The apparatus may include means for transmitting, to a second BS associated with the second RAT and based at least in part on determining that the command of mobility is for voice fallback, an RRC connection request communication for attempting to communicatively connect with the second BS for voice fallback. some aspects, the apparatus may perform or implement any one or more of the aspects described in connection with the method, above or elsewhere herein.

Another innovative aspect of the subject matter described in this disclosure can be implemented in a method of wireless communication performed by a BS. The method may include determining that a UE, communicatively connected with the BS, is establishing a voice call, the BS being associated with a 5G NR RAT. The method may include transmitting, based at least in part on determining that the UE is establishing the voice call, a command of mobility from the 5G NR RAT to a second RAT, the command of mobility including a voice fallback indication.

In some aspects, the second RAT includes an LTE RAT or a 3G RAT. In some aspects, transmitting the command of mobility includes transmitting the command of mobility to at least one of another BS or the UE. In some aspects, the command of mobility is included in at least one of a transparent container included in an S1AP communication transmitted to another BS, an RANAP communication transmitted to the other BS, a HandoverPreparationInformation LTE RRC communication transmitted to the other BS, a MobilityFromNRCommand NR RRC communication transmitted to the UE, a HandoverCommand LTE RRC communication transmitted to the UE, or an RRCRelease NR RRC communication transmitted to the UE, a source RNC to target RNC transparent container, or a UTRAN RRC connection request communication.

Another innovative aspect of the subject matter described in this disclosure can be implemented in a BS for wireless communication. The BS may include memory and one or more processors operatively coupled to the memory. The memory and the one or more processors may be configured to determine that a UE, communicatively connected with the BS, is establishing a voice call, the BS being associated with a 5G NR RAT. The memory and the one or more processors may be configured to transmit, based at least in part on determining that the UE is establishing the voice call, a command of mobility from the 5G NR RAT to a second RAT, the command of mobility including a voice fallback indication. In some aspects, the BS may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to determine that a UE, communicatively connected with the BS, is establishing a voice call, the BS being associated with a 5G NR RAT. The one or more instructions, when executed by one or more processors of a BS, may cause the one or more processors to transmit, based at least in part on determining that the UE is establishing the voice call, a command of mobility from the 5G NR RAT to a second RAT, the command of mobility including a voice fallback indication. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for determining that a UE, communicatively connected with the apparatus, is establishing a voice call, the apparatus being associated with a 5G NR RAT. The apparatus may include means for transmitting, based at least in part on determining that the UE is establishing the voice call, a command of mobility from the 5G NR RAT to a second RAT, the command of mobility including a voice fallback indication. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

Like reference numbers and designations in the various drawings indicate like elements.

DETAILED DESCRIPTION

Figure 1:
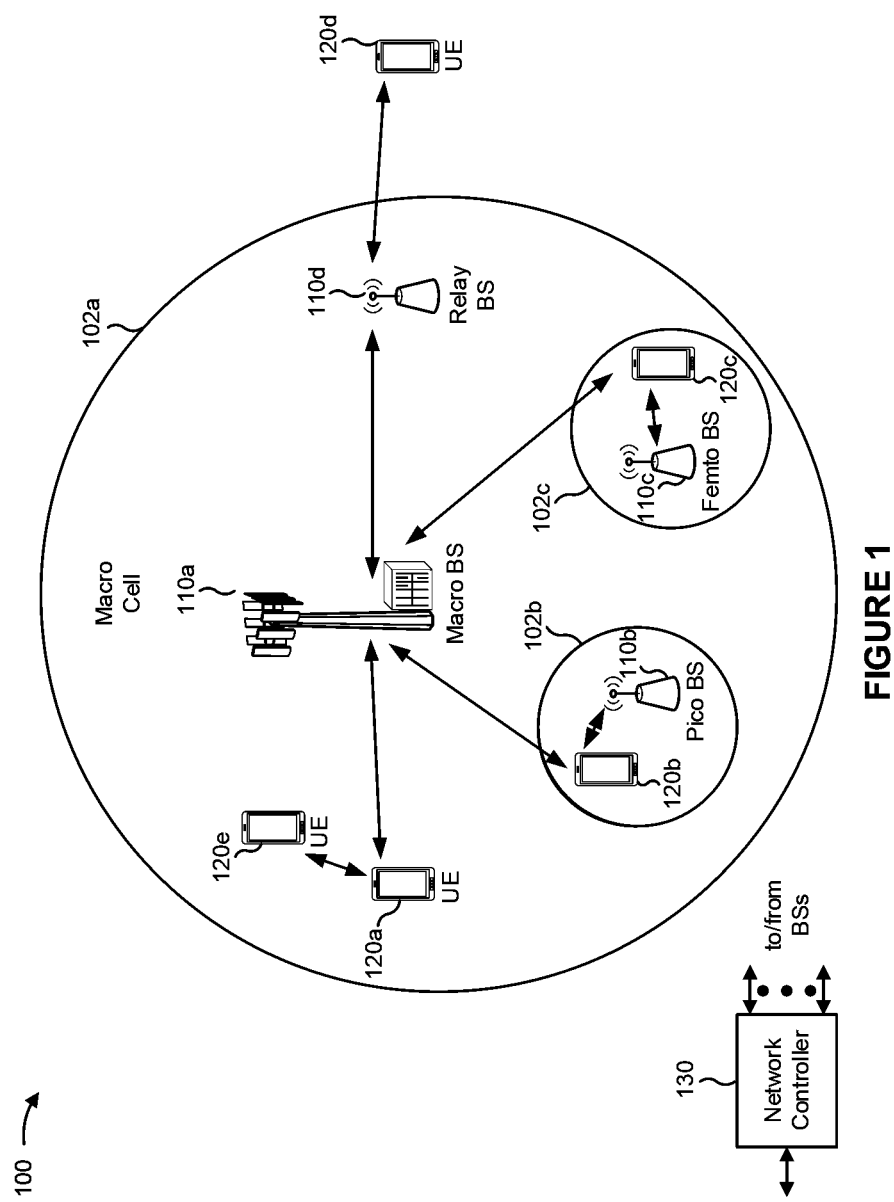
FIG. 1 is a block diagram conceptually illustrating an example of a wireless network.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to one having ordinary skill in the art. Based on the teachings herein, one having ordinary skill in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including New Radio (NR) technologies.

In some deployments of 5G NR, a 5G next generation nodeB (gNB), may not support voice over NR (VoNR). To support a voice call in a 5G NR deployment, a procedure for voice fallback, from 5G NR to another radio access technology (RAT) (Long Term Evolution (LTE) or 3G, for example), may be implemented to service the voice call. The procedure may include a handover or redirection from the gNB to an LTE evolved nodeB (eNB) (VoNR to voice over LTE (VoLTE) voice fallback), a handover or redirection from the gNB to a 3G nodeB (VoNR to 3G circuit switched voice fallback), or another type of 5G NR voice fallback procedure.

In some cases, during a 5G NR voice fallback procedure, a source BS (the BS that is serving a UE) may not inform the UE or a target BS (the BS that the UE is to be handed over to or redirected to) that the handover or redirection is for purposes of 5G NR voice fallback. As a result, the target BS may not be aware that the target BS is to prioritize radio resource allocation, to the UE, for supporting a voice call associated with the UE, which may cause a delay in the setup of the voice call, may cause degraded performance in servicing the voice call, and the like. Moreover, if the handover or redirection fails, and the UE is not aware the handover or redirection is for purposes of 5G NR voice fallback, the UE may return to the source BS (which does not support voice calls) without reattempting to connect with the target BS or another BS that supports voice calls, which may cause further delays establishing the voice call.

Some aspects described herein provide techniques and apparatuses for voice fallback in 5G NR. In some aspects, a source BS may receive an indication that a UE is establishing a voice call. The source BS may include a gNB or another type of BS that does not support VoNR. Accordingly, the source BS may initiate a 5G NR voice fallback procedure, which may include a handover or redirection of the UE to a target BS associated with a RAT that supports another type of voice service, such as LTE (VoLTE), 3G (circuit switched voice), or further examples. During the 5G NR voice fallback procedure, the source BS may transmit, to the UE and the target BS, a command of mobility, which may include an indication that the handover or redirection is for purposes of 5G NR voice fallback.

In this way, the target BS is made aware that the handover or redirection is for purposes of 5G NR voice fallback, which permits the target BS to prioritize radio resource allocation, to the UE, for supporting the voice call, which may reduce delays in establishing the voice call, and may reduce performance degradation in servicing the voice call. Moreover, in this way, the UE is made aware that the handover or redirection is for purposes of 5G NR voice fallback, which permits the UE to perform various actions, such as indicating, to the target BS, that the UE is attempting to connect to the target BS for purposes of 5G NR voice fallback, such as automatically reattempting to connect to the target BS or another BS that supports voice calls (before returning to the source BS) if the handover or redirection fails, which reduces delays in establishing the voice call.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with UEs and also may be referred to as a base station, a NR BS, a NodeB, a gNB, a 5G nodeB (NB), an access point, a transmit receive point (TRP), or further examples, or combinations thereof. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another or to one or more other BSs or network nodes (not shown) in the wireless network 100 through various types of backhaul interfaces such as a direct physical connection, a virtual network, or further examples using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or further examples, or combinations thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, such as when a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or further examples, or combinations thereof), a mesh network, or further examples, or combinations thereof. In this case, the UE 120 may perform scheduling operations, resource selection operations, or other operations described elsewhere herein as being performed by the base station 110.

Figure 2:
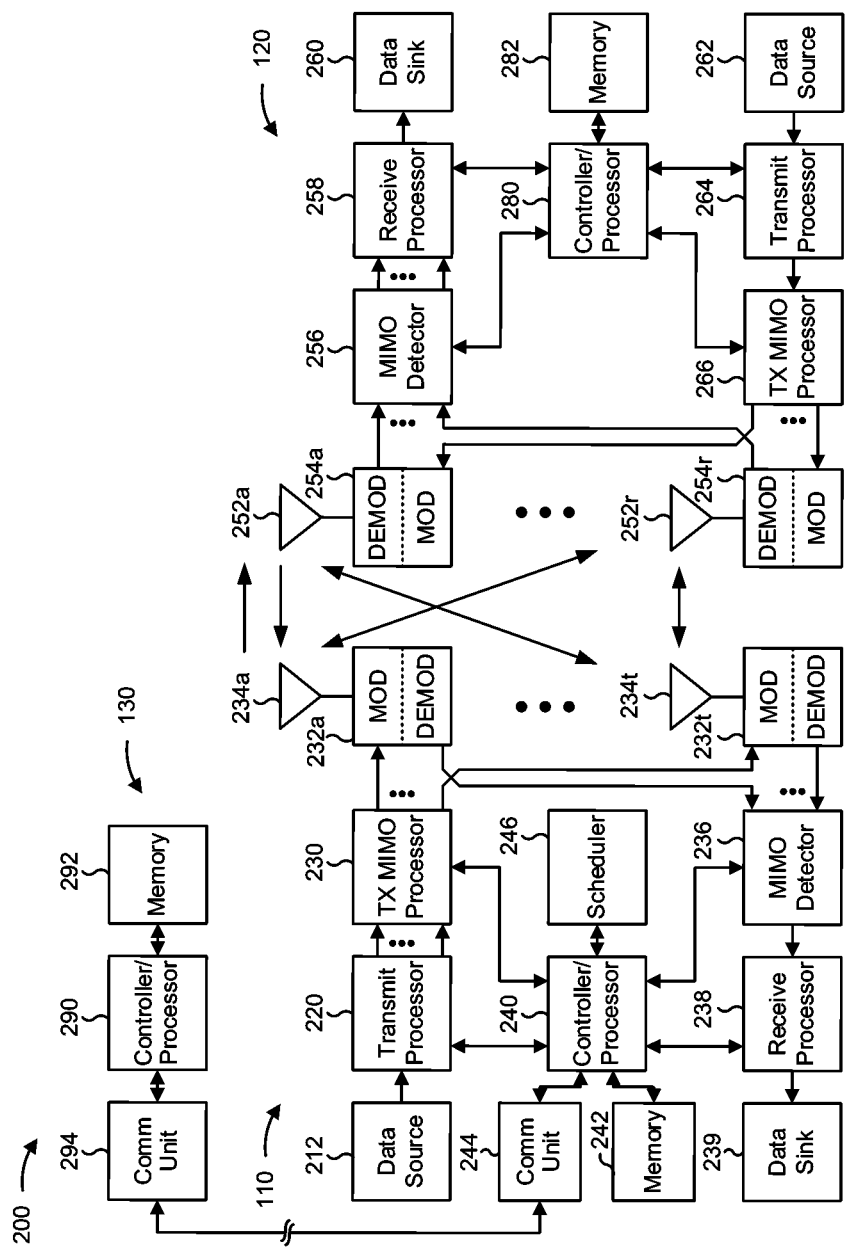
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120 in a wireless network. Base station 110 and UE 120 may respectively be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Transmit processor 220 also may process system information (for example, for semi-static resource partitioning information (SRPI), etc.) and control information (for example, CQI requests, grants, upper layer signaling, etc.) and provide overhead symbols and control symbols. Transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (controller/processor) 240. Base station 110 may include communication unit 244 and communicate to network controller 130 via communication unit 244. Network controller 130 may include communication unit 294, controller or processor (controller/processor) 290, and memory 292.

Controller/processor 240 of base station 110, controller/processor 280 of UE 120, or any other component(s) of FIG. 2 may perform one or more techniques associated with voice fallback for 5G NR, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, or other processes as described herein. Memories 242 and 282 may store data and program codes for base station 110 and UE 120, respectively. A scheduler 246 may schedule UEs for data transmission on the downlink or uplink.

Figure 4:
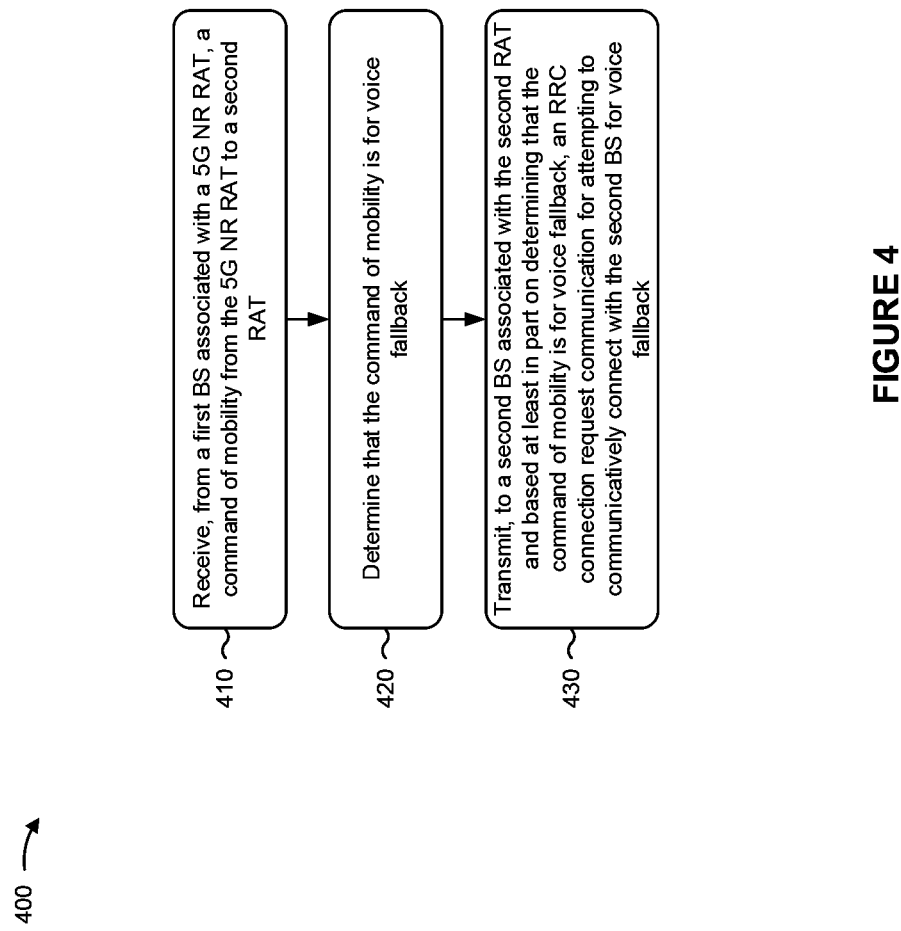
FIG. 4 is a diagram illustrating an example process performed, for example, by a UE.

The stored program codes, when executed by controller/processor 280 or other processors and modules at UE 120, may cause UE 120 to perform operations described with respect to process 400 of FIG. 4 or other processes as described herein. The stored program codes, when executed by controller/processor 240 or other processors and modules at base station 110, may cause base station 110 to perform operations described with respect to process 500 of FIG. 5 or other processes as described herein. A scheduler 246 may schedule UEs for data transmission on the downlink or uplink.

In some aspects, UE 120 may include means for receiving, from a first BS 110 associated with a 5G NR RAT, a command of mobility from the 5G NR RAT to a second RAT, means for determining that the command of mobility is for voice fallback, means for transmitting, to a second BS 110 associated with the second RAT and based at least in part on determining that the command of mobility is for voice fallback, an RRC connection request communication for attempting to communicatively connect with the second BS 110 for voice fallback, or further examples, or combinations thereof. In some aspects, such means may include one or more components of UE 120 described in connection with FIG. 2.

In some aspects, base station 110 may include means for determining that a UE 120, communicatively connected with the BS 110, is establishing a voice call, the BS being associated with a 5G NR RAT, means for transmitting, based at least in part on determining that the UE 120 is establishing the voice call, a command of mobility from the 5G NR RAT to a second RAT, the command of mobility including a voice fallback indication, or further examples, or combinations thereof. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, or the TX MIMO processor 266 may be performed by or under the control of controller/processor 280.

Figure 3:
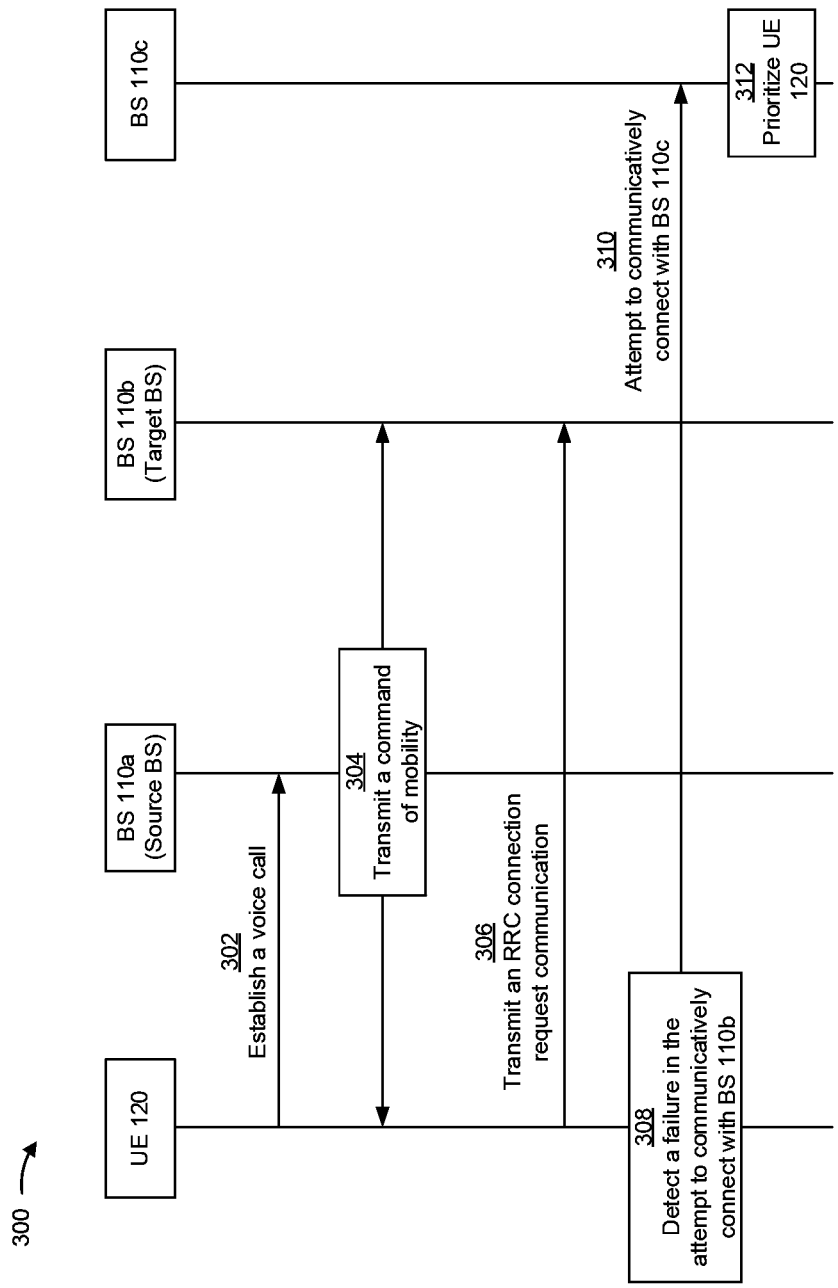
FIG. 3 is a diagram illustrating an example of voice fallback in fifth generation (5G) New Radio (NR).

FIG. 3 is a diagram illustrating an example 300 of voice fallback for 5G NR. As shown in FIG. 3, example 300 may include a UE (such as the UEs 120a-120e depicted and described in FIG. 1 or the UE 120 depicted and described in FIG. 2) and a plurality of BSs (such as the BSs 110a-110d depicted and described in FIG. 1 or the BS 110 depicted in FIG. 2). In some aspects, BS 110a may include a gNB that is associated with a 5G NR RAT. In some aspects, BS 110b and BS 110c may include another type of BS, such as an eNB associated with an LTE RAT, a 3G nodeB associated with a 3G RAT, or further examples.

In some aspects, the plurality of BSs may represent a plurality of cells provided by one or more BSs. For example, a single BS may provide the plurality of cells, where a first cell (corresponding to BS 110a) of the BS is associated with a 5G NR RAT, a second cell (corresponding to BS 110b) of the BS is associated with an LTE RAT or a 3G RAT, and a third cell (corresponding to BS 110c) of the BS is associated with an LTE RAT or a 3G RAT. As another example, the first cell (corresponding to BS 110a) associated with a 5G NR RAT may be provided by a first BS, a second cell (corresponding to BS 110b) associated with an LTE RAT or a 3G RAT may be provided by a second BS (different from the first BS or the same BS as the first BS), and a third cell (corresponding to BS 110c) associated with an LTE RAT or a 3G RAT may be provided by a third BS (different from the first BS or the same as the first BS, different from the second BS or the same as the second BS, or further examples).

As shown in FIG. 3, and by reference number 302, UE 120 may establish a voice call. In some aspects, the voice call may include a mobile originating (MO) voice call (a voice call originated by UE 120), a mobile terminating (MT) voice call (a voice call terminated at UE 120), or further examples. In some aspects, UE 120 may establish the voice call by initiating a quality of service (QoS) flow for a connection with an Internet protocol multimedia subsystem (IMS) to service the voice call. The QoS flow may be associated with one or more QoS parameters for the voice call, such as a packet loss rate parameter, a latency parameter, a throughput parameter, a packet error rate parameter, or other QoS parameters.

In some aspects, BS 110a may determine that UE 120 is establishing the voice call. For example, BS 110a may identify the QoS flow for the voice call based at least in part on receiving, from UE 120, an indication of the QoS flow. The indication may include a 5G QoS identifier (5QI) or another type of identifier.

In some aspects, BS 110a may determine that BS 110a cannot support the QoS flow because BS 110a is associated with a RAT that does not support voice calls. Accordingly, BS 110a may reject the setup of the QoS flow and may initiate a 5G NR voice fallback of UE 120 to BS 110b, which may support voice calls. As indicated above, BS 110b may be associated with an LTE RAT, a 3G RAT, or another type of RAT that supports voice calls.

As further shown in FIG. 3, and by reference number 304, to initiate the 5G NR voice fallback, BS 110a may transmit a command of mobility to UE 120, to BS 110b, or to a combination of UE 120 and BS 110b. The command of mobility may be for voice fallback from the 5G NR RAT to another RAT that supports voice calls, such as an LTE RAT or a 3G RAT. In some aspects, when the command of mobility is transmitted to UE 120, the command of mobility may include a handover communication or a redirection communication. In some aspects, the handover communication may include a MobilityFromNRCommand NR RRC communication, a HandoverCommand LTE RRC communication, or another type of handover communication. In some aspects, the redirection communication may include an RRCRelease NR RRC communication or another type of redirection communication. In some aspects, the command of mobility may include a source radio network controller (RNC) to target RNC transparent container or a universal mobile telecommunications system terrestrial radio access network (UTRAN) RRC connection request communication if the other RAT is a 3G RAT.

In some aspects, BS 110a may include, in the command of mobility, a voice fallback indication. The voice fallback indication may include an information element (IE), such as a voiceFallbackIndication IE or another type of IE, that indicates the command of mobility is for voice fallback from the 5G NR RAT to another RAT that supports voice calls.

In some aspects, when the command of mobility is transmitted to BS 110b, the command of mobility may include an s1 application protocol (S1AP) communication, a radio access network application part (RANAP) communication, an RRC communication, or similar type of communication. The RRC communication may include a HandoverPreparationInformation LTE RRC communication or another type of RRC communication. If BS 110b is associated with an LTE RAT, the command of mobility may include a voice fallback indication, such as a voiceFallbackIndication IE or another type of IE, that indicates the command of mobility is for voice fallback from the 5G NR RAT to another RAT that supports voice calls. If BS 110b is associated with a 3G RAT or another type of RAT that supports circuit switched voice calls, the command of mobility may include a voice fallback indication, such as a circuit switched fallback (CSFB) Information IE or another type of IE, that indicates the command of mobility is for voice fallback from the 5G NR RAT to another RAT that supports voice calls.

As further shown in FIG. 3, and by reference number 306, UE 120 may attempt to communicatively connect with BS 110b by transmitting an RRC connection request communication to BS 110b. In some aspects, UE 120 may transmit the RRC connection request communication based at least in part on receiving the command of mobility and determining that the command of mobility is for voice fallback.

In some aspects, UE 120 may determine that the command of mobility is for voice fallback based at least in part on identifying a voice fallback indication, included in the command of mobility, that indicates the command of mobility is for voice fallback. In some aspects, UE 120 may implicitly determine that the command of mobility is for voice fallback based at least in part on receiving the command for mobility while establishing the voice call, based at least in part on a whether UE 120 is capable of implementing a VoNR voice call (for example, UE 120 may infer that the handover or redirection is for voice fallback if UE 120 is not capable of implementing a VoNR voice call), or further examples, or a combination thereof.

In some aspects, UE 120 may include, in the RRC connection request, an indication that the voice call is a cause value for the RRC connection request communication. The cause value may indicate, to BS 110b, the purpose of UE 120 attempting to communicatively connect with BS 110b. BS 110b may use the indication of the voice call, in the RRC connection request communication, to prioritize radio resource allocation to UE 120. In this way, UE 120 may be assigned a higher priority relative to other UEs connected to BS 110b in order to ensure that the 5G NR voice callback procedure is successful.

As further shown in FIG. 3, and by reference number 308, UE 120 may detect a failure in the attempt to communicatively connect with BS 110b. For example, UE 120 may determine that a connection could not be established within a particular time window for establishing the connection, and may accordingly determine that the attempt to communicatively connect with BS 110b has failed or was unsuccessful.

As further shown in FIG. 3, and by reference number 310, UE 120 may, based at least in part on detecting that failure in the attempt to communicatively connect with BS 110b, perform various actions based at least in part on the command of mobility being for 5G NR voice fallback. For example, and as shown in FIG. 3, may attempt to communicatively connect with BS 110c, which may be associated with an LTE RAT, a 3G RAT, or another RAT that supports voice calls. As another example, UE 120 may reattempt to communicatively connect with BS 110b. In this way, UE 120 may reduce the delay caused by the failed connection attempt by attempting to connect to a BS that is associated with a RAT that supports voice calls instead of reconnecting to BS 110a, which is associated with a RAT that may not support voice calls.

As further shown in FIG. 3, and by reference number 312, once UE 120 is communicatively connected with BS 110c, BS 110c may prioritize UE 120 in order to support the voice call. In some aspects, BS 110c may prioritize UE 120 based at least in part on the voice fallback indication received from BS 110a, may prioritize UE 120 based at least in part on the voice call cause value indicated by UE 120, or a combination thereof. In some aspects, BS 110c may prioritize UE 120 when assigning radio resources associated with BS 110c. For example, BS 110c may be configured to prioritize voice calls over other types of packet traffic (for example, to ensure that voice quality and latency parameters are satisfied), and accordingly may prioritize assigning radio resources to UE 120 over assigning the radio resources to other UEs communicatively connected with BS 110c.

Accordingly, BS 110a may initiate a 5G NR voice fallback procedure, which may include a handover or redirection of UE 120 to BS 110b. During the 5G NR voice fallback procedure, BS 110a may transmit, to UE 120 and BS 110b, a command of mobility, which may include an indication that the command of mobility is for 5G NR voice fallback to another RAT that supports voice calls. In this way, BS 110b is made aware that a handover or redirection of UE 120 to BS 110b is for purposes of 5G NR voice fallback, which permits BS 110b to prioritize radio resource allocation to UE 120 for optimizing the cell, associated with BS 110b, for supporting the voice call, which may reduce delays in establishing the voice call, and may reduce performance degradation in servicing the voice call. Moreover, in this way, UE 120 is made aware that the handover or redirection is for purposes of 5G NR voice fallback, which permits UE 120 to perform various actions, such as indicating, to BS 110b, that UE 120 is attempting to connect to BS 110b for purposes of 5G NR voice fallback, such as automatically attempting to connect to BS 110c (before returning to BS 110a) if the handover or redirection fails, which reduces delays in establishing the voice call.

FIG. 4 is a diagram illustrating an example process 400 performed, for example, by a UE. The example process 400 shows where a UE (such as UE 120) performs voice fallback for 5G NR.

As shown in FIG. 4, in some aspects, the process 400 may include receiving, from a first BS associated with a 5G NR RAT, a command of mobility from the 5G NR RAT to a second RAT (block 410). For example, the UE (for example, using receive processor 258, controller/processor 280, memory 282, or further examples, or a combination thereof) may receive, from a first BS associated with a 5G NR RAT, a command of mobility from the 5G NR RAT to a second RAT, as described above.

As shown in FIG. 4, in some aspects, the process 400 may include determining that the command of mobility is for voice fallback (block 420). For example, the UE (for example, using receive processor 258, transmit processor 264, controller/processor 280, memory 282, or further examples, or a combination thereof) may determine that the command of mobility is for voice fallback, as described above.

As shown in FIG. 4, in some aspects, the process 400 may include transmitting, to a second BS associated with the second RAT and based at least in part on determining that the command of mobility is for voice fallback, an RRC connection request communication for attempting to communicatively connect with the second BS for voice fallback (block 430). For example, the UE (for example, using transmit processor 264, controller/processor 280, memory 282, or further examples, or a combination thereof) may transmit, to a second BS associated with the second RAT and based at least in part on determining that the command of mobility is for voice fallback, an RRC connection request communication for attempting to communicatively connect with the second BS for voice fallback, as described above.

The process 400 may include additional aspects, such as any single aspect or any combination of aspects described below or in connection with one or more other processes described elsewhere herein.

In a first aspect, the second RAT includes an LTE RAT or a 3G RAT. In a second aspect, alone or in combination with the first aspect, determining that the command of mobility is for voice fallback includes determining that the command of mobility is for voice fallback based at least in part on identifying a voice fallback indication included in the command of mobility. In a third aspect, alone or in combination with one or more of the first or second aspects, the command of mobility is included in a MobilityFromNRCommand NR RRC communication, a HandoverPreparationInformation LTE RRC communication, an RRCRelease NR RRC communication, a source RNC to target RNC transparent container, or a UTRAN RRC connection request communication.

In a fourth aspect, alone or in combination with one or more of the first through third aspects, determining that the command of mobility is for voice fallback includes determining that the command of mobility is for voice fallback based at least in part on at least one of receiving the command of mobility while establishing the voice call or a capability of the UE to implement a VoNR voice call. In a fifth aspect, alone or in combination with one or more of the first through fourth aspects, the RRC connection request communication indicates a voice call as a cause value.

In a sixth aspect, alone or in combination with one or more of the first through fifth aspects, process 400 includes detecting a failure in the attempt to communicatively connect with the second BS and attempting to communicatively connect with a third BS associated with the second RAT based at least in part on detecting the failure in the attempt to communicatively connect with the second BS and based at least in part on receiving the command of mobility. In a seventh aspect, alone or in combination with one or more of the first through sixth aspects, the first BS and the second BS are different BSs, the 5G NR RAT is associated with a cell of the first BS, and the second RAT is associated with a cell of the second BS.

In an eighth aspect, alone or in combination with one or more of the first through seventh aspects, the first BS, the second BS, and the third BS are a same BS, the 5G NR RAT is associated with a first cell of the same BS, the second RAT is associated with a second cell of the same BS, and the second RAT is associated with a third cell of the same BS. In a ninth aspect, alone or in combination with one or more of the first through eighth aspects, the first BS, the second BS, and the third BS are different BSs, the 5G NR RAT is associated with a cell of the first BS, the second RAT is associated with a cell of the second BS, and the second RAT is associated with a cell of the third BS.

In a tenth aspect, alone or in combination with one or more of the first through ninth aspects, the second BS and the third BS are different BSs, the second RAT is associated with a cell of the second BS, and the second RAT is associated with a cell of the third BS. In an eleventh aspect, alone or in combination with one or more of the first through tenth aspects, the second BS and the third BS are a same BS, the second RAT is associated with a first cell of the same BS, the second RAT is associated with a second cell of the third BS.

In a twelfth aspect, alone or in combination with one or more of the first through eleventh aspects, the first BS and the third BS are a same BS, the 5G NR RAT is associated with a first cell of the same BS, and the second RAT is associated with a second cell of the same BS. In a thirteenth aspect, alone or in combination with one or more of the first through twelfth aspects, the first BS and the second BS are a same BS, the 5G NR RAT is associated with a first cell of the same BS, and where the second RAT is associated with a second cell of the same BS.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
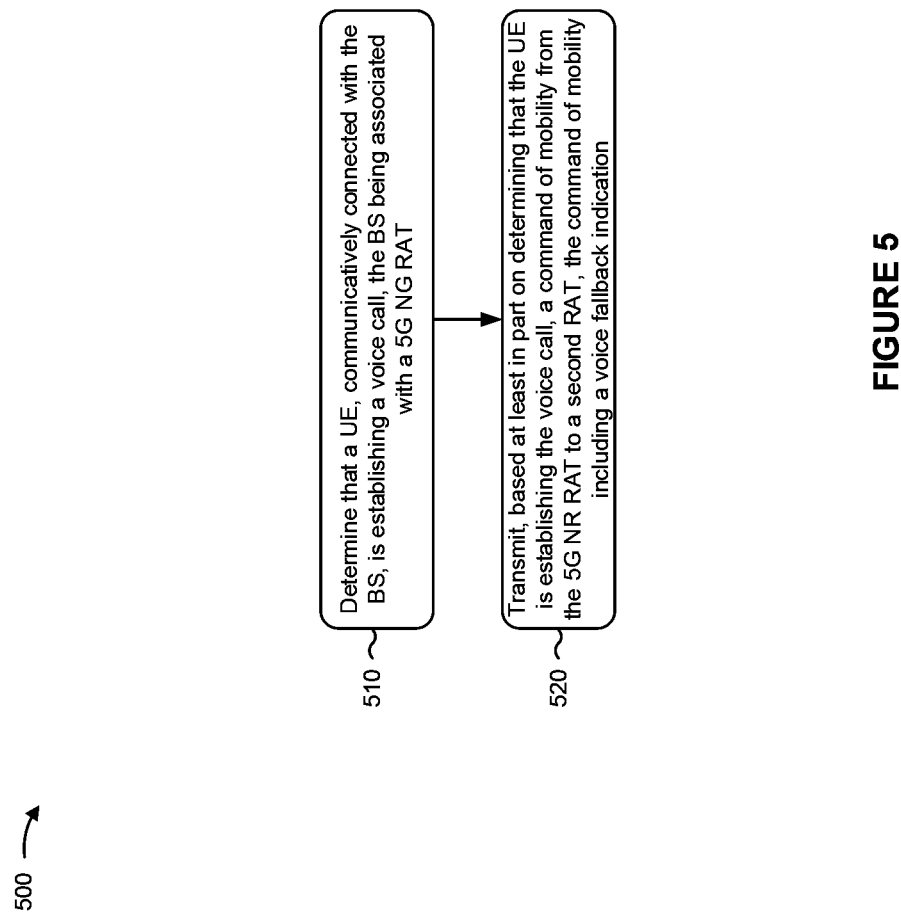
FIG. 5 is a diagram illustrating an example process performed, for example, by a BS.

FIG. 5 is a diagram illustrating an example process 500 performed, for example, by a BS. The example process 500 shows where a BS (such as BS 110a or BS 110b) performs operations associated with voice fallback for 5G NR.

As shown in FIG. 5, in some aspects, the process 500 may include determining that a UE, communicatively connected with the BS, is establishing a voice call, the BS being associated with a 5G NR RAT (block 510). For example, the BS (for example, using transmit processor 220, receive processor 238, controller/processor 240, memory 242, or further examples, or a combination thereof) may determine that a UE, communicatively connected with the BS, is establishing a voice call, as described above. In some aspects, the BS is associated with a 5G NR RAT.

As shown in FIG. 5, in some aspects, the process 500 may include transmitting, based at least in part on determining that the UE is establishing the voice call, a command of mobility from the 5G NR RAT to a second RAT, the command of mobility including a voice fallback indication (block 520). For example, the BS (for example, using transmit processor 220, controller/processor 240, memory 242, or further examples, or a combination thereof) may transmit, based at least in part on determining that the UE is establishing the voice call, a command of mobility from the 5G NR RAT to a second RAT, as described above. In some aspects, the command of mobility may include a voice fallback indication.

The process 500 may include additional aspects, such as any single aspect or any combination of aspects described below or in connection with one or more other processes described elsewhere herein.

In a first aspect, the second RAT includes an LTE RAT or a 3G RAT. In a second aspect, alone or in combination with the first aspect, transmitting the command of mobility includes transmitting the command of mobility to at least one of another BS or the UE. In a third aspect, alone or in combination with one or more of the first or second aspects, the command of mobility is included in at least one of a transparent container included in an S1AP communication transmitted to another BS, an RANAP communication transmitted to the other BS, a HandoverPreparationInformation LTE RRC communication transmitted to the other BS, a MobilityFromNRCommand NR RRC communication transmitted to the UE, a HandoverCommand LTE RRC communication transmitted to the UE, or an RRCRelease NR RRC communication transmitted to the UE, a source RNC to target RNC transparent container, or a UTRAN RRC connection request communication.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software. As used herein, the phrase "based on" is intended to be broadly construed to mean "based at least in part on" unless explicitly stated otherwise.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. "Disk" and "disc," as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:

receiving, from a first base station (BS) associated with a fifth generation New Radio (5G NR) radio access technology (RAT), a command of mobility including a voiceFallbackIndication information element indicating that the command of mobility is for voice fallback from the 5G NR RAT to a Long Term Evolution (LTE) RAT,
  wherein the command of mobility is included in a radio resource control (RRC) release communication, the RRC release communication being a RRCRelease NR RRC communication;
 including, in a RRC connection request communication, an indication that a voice call is a cause value for the RRC connection request communication; and
 transmitting, to a second BS associated with the LTE RAT and based at least in part on receiving the command of mobility including the voiceFallbackIndication information element, the RRC connection request communication for attempting to communicatively connect with the second BS for voice fallback.

2. The method of claim 1, wherein a mobile originating (MO) voice call or a mobile terminating (MT) voice call is established between the UE and the first BS.

3. The method of claim 1, wherein the cause value being indicated as the voice call enables the second BS to prioritize resource allocation to the UE.

4. The method of claim 1, wherein receiving the command of mobility comprises:
  receiving the command of mobility while establishing the voice call.

5. The method of claim 1, further comprising:
 establishing the voice call with the first BS.

6. The method of claim 5, wherein the voice call is a mobile originating (MO) voice call or a mobile terminating (MT) voice call.

7. The method of claim 1, wherein the voice call is a voice over NR (VoNR) voice call.

8. The method of claim 1, further comprising:
  detecting a failure associated with attempting to communicatively connect with the second BS for voice fallback; and
  attempting, based at least in part on the detection of the failure, to communicate with a third BS.

9. The method of claim 1, further comprising:
  detecting a failure associated with attempting to communicatively connect with the second BS for voice fallback; and
  reattempting, based at least in part on the detection of the failure, to communicate with the second BS.

10. A user equipment (UE) for wireless communication, comprising:
 a memory; and
 one or more processors coupled to the memory, the one or more processors configured to:
  receive, from a first base station (BS) associated with a fifth generation New Radio (5G NR) radio access technology (RAT), a command of mobility including a voiceFallbackIndication information element indicating that the command of mobility is for voice fallback from the 5G NR RAT to a Long Term Evolution (LTE) RAT,
   wherein the command of mobility is included in a radio resource control (RRC) release communication, the RRC release communication being a RRCRelease NR RRC communication;
  include, in a RRC connection request communication, an indication that a voice call is a cause value for the RRC connection request communication; and
  transmit, to a second BS associated with the LTE RAT and based at least in part on receiving the command of mobility including the voiceFallbackIndication information element, the RRC connection request communication for attempting to communicatively connect with the second BS for voice fallback.

11. The UE of claim 10, wherein a mobile originating (MO) voice call or a mobile terminating (MT) voice call is established between the UE and the first BS.

12. The UE of claim 10, wherein the cause value being indicated as the voice call enables the second BS to prioritize resource allocation to the UE.

13. The UE of claim 10, wherein the one or more processors, to receive the command of mobility, are configured to:
 receive the command of mobility while establishing the voice call.

14. The UE of claim 10, wherein the one or more processors are further configured to:
 establish the voice call with the first BS.

15. The UE of claim 14, wherein the voice call is a mobile originating (MO) voice call or a mobile terminating (MT) voice call.

16. The UE of claim 10, wherein the voice call is a voice over NR (VoNR) voice call.

17. A non-transitory computer-readable medium storing a set of instructions for wireless communication, the set of instructions comprising:
 one or more instructions that, when executed by one or more processors of a user equipment (UE), cause the UE to:
  receive, from a first base station (BS) associated with a fifth generation New Radio (5G NR) radio access technology (RAT), a command of mobility including a voiceFallbackIndication information element indicating that the command of mobility is for voice fallback from the 5G NR RAT to a Long Term Evolution (LTE) RAT,
   wherein the command of mobility is included in a radio resource control (RRC) release communication, the RRC release communication being a RRCRelease NR RRC communication;
  include, in a RRC connection request communication, an indication that a voice call is a cause value for the RRC connection request communication; and
  transmit, to a second BS associated with the LTE RAT and based at least in part on receiving the command of mobility including the voiceFallbackIndication information element, the RRC connection request communication for attempting to communicatively connect with the second BS for voice fallback.

18. The non-transitory computer-readable medium of claim 17, wherein a mobile originating (MO) voice call or a mobile terminating (MT) voice call is established between the UE and the first BS.

19. The non-transitory computer-readable medium of claim 17, wherein the one or more instructions, that cause the UE to receive the command of mobility, cause the UE to:
 receive the command of mobility while establishing the voice call.

20. The non-transitory computer-readable medium of claim 17, wherein the one or more instructions further cause the UE to:
 establish the voice call with the first BS.

21. The non-transitory computer-readable medium of claim 20, wherein the voice call is a mobile originating (MO) voice call or a mobile terminating (MT) voice call.

22. The non-transitory computer-readable medium of claim 17, wherein the cause value being indicated as the voice call enables the second BS to prioritize resource allocation to the UE.

23. The non-transitory computer-readable medium of claim 17, wherein the voice call is a voice over NR (VoNR) voice call.

24. An apparatus for wireless communication, comprising:
- means for receiving, from a first base station (BS) associated with a fifth generation New Radio (5G NR) radio access technology (RAT), a command of mobility including a voiceFallbackIndication information element indicating that the command of mobility is for voice fallback from the 5G NR RAT to a Long Term Evolution (LTE) RAT,
  - wherein the command of mobility is included in a radio resource control (RRC) release communication, the RRC release communication being a RRCRelease NR RRC communication;
- means for including, in a RRC connection request communication, an indication that a voice call is a cause value for the RRC connection request communication; and
- means for transmitting, to a second BS associated with the LTE RAT and based at least in part on receiving the command of mobility including the voiceFallbackIndication information element, the RRC connection request communication for attempting to communicatively connect with the second BS for voice fallback.

25. The apparatus of claim 24, wherein a mobile originating (MO) voice call or a mobile terminating (MT) voice call is established between a user equipment (UE) and the first BS.

26. The apparatus of claim 24, wherein the means for receiving the command of mobility comprises:
- means for receiving the command of mobility while establishing the voice call.

27. The apparatus of claim 24, further comprising:
- means for establishing the voice call with the first BS.

28. The apparatus of claim 27, wherein the voice call is a mobile originating (MO) voice call or a mobile terminating (MT) voice call.

29. The apparatus of claim 24, wherein the voice call is a voice over NR (VoNR) voice call.

30. The apparatus of claim 24, wherein the cause value being indicated as the voice call enables the second BS to prioritize resource allocation to the apparatus.

* * * * *